United States Patent [19]
Ort

[11] Patent Number: 4,748,858
[45] Date of Patent: Jun. 7, 1988

[54] STRAIN GAGE TRANSDUCER

[75] Inventor: Werner Ort, Darmstadt, Fed. Rep. of Germany

[73] Assignee: Hottinger Baldwin Messtechnik GmbH, Darmstadt, Fed. Rep. of Germany

[21] Appl. No.: 888,821

[22] Filed: Jul. 22, 1986

[30] Foreign Application Priority Data

Aug. 8, 1985 [DE] Fed. Rep. of Germany ....... 3528510

[51] Int. Cl.$^4$ ........................... G01D 3/04; G01L 1/22
[52] U.S. Cl. .................................... 73/862.63; 73/766; 73/862.67
[58] Field of Search ........... 73/862.63, 862.65, 862.67, 73/765, 766, 775, 776

[56] References Cited

U.S. PATENT DOCUMENTS

| | | | |
|---|---|---|---|
| 3,034,347 | 5/1962 | Starr | 73/862.67 X |
| 4,329,878 | 5/1982 | Utner et al. | 73/862.63 X |
| 4,332,174 | 6/1982 | Suzuki et al. | 73/862.67 X |
| 4,432,247 | 2/1984 | Takeno et al. | 73/862.67 |
| 4,520,339 | 5/1985 | Utsunomiya | 73/862.63 X |

FOREIGN PATENT DOCUMENTS 1644759 8/1973 Fed. Rep. of Germany .
2916390 5/1982 Fed. Rep. of Germany .

Primary Examiner—Charles A. Ruehl
Attorney, Agent, or Firm—W. G. Fasse; D. H. Kane, Jr.

[57] ABSTRACT

A strain gage transducer or rather a large group of such transducers is balanced by a combination of at least one balancing resistor embedded in an insulating member and connected in a corner of a bridge circuit formed by the strain gages, and a number of adjustment resistors included in a flat, flexible printed circuit type cable having first conductor strips connected at one inner end to said balancing resistor in the embedding insulating member and electrically interconnected at the other output end. The adjustment resistors form part of the flat first conductor strips and are initially short-circuited by respective conductor strip sections which are interrupted for the adjustment.

6 Claims, 2 Drawing Sheets

STRAIN GAGE TRANSDUCER

FIELD OF THE INVENTION

The invention relates to strain gage transducers having four strain gages attached to a carrier spring and electrically interconnected to form a measuring bridge. At least one balancing resistor, in addition to the resistors formed by the strain gages, is connected into a corner of the bridge. This additional balancing resistor has a temperature dependent characteristic and is located in an intimate heat transfer contact with the carrier spring.

DESCRIPTION OF THE PRIOR ART

It is known to adjust the temperature response characteristic of the null signal of strain gage transducers by inserting a temperature dependent or temperature responsive balancing resistor into the strain gage measuring bridge circuit. This temperature responsive balancing resistor is so dimensioned that the temperature dependent variation of the null signal remains within a given tolerance range. Frequently, such balancing resistors are used in commercial scales and are thus subject to the official calibration requirements. Such strain gage transducers are then called weighing cells. Such weighing cells, due to costs, are not embedded or encapsulated in a hermetically sealing embedding material as is normally the case with strain gage transducers. It is thus an official requirement, at least in Germany, that such weighing cells are subjected to a severe testing procedure lasting for fifty days under extreme climatic conditions. In order to pass such a test at all, it is customary to etch all four strain gages together with their wiring as a one piece structure out of a metal foil and to cover the structure with another metal foil for protection against moisture. The zone in which the cable connections are made and the tuning or balancing takes place, is embedded in an insulating embedding member. This embedding member, however, changes the temperature response characteristic of the null signal in an uncontrollable manner. Stated differently, an exact measurement is possible only in the encapsulated or embedded condition of the weighing cell. As a result, the final inspection of the product frequently reveals that the desired tolerance of the temperature response characteristic of the null signal is not satisfied. A further balancing after the embedding has been completed, is not possible so that this type of production results in a substantial number of rejects, whereby the production costs become too high. The situation is even aggrevated because the tolerance requirements made by the market place become ever stricter.

German Patent (DE-PS) No. 2,916,390 discloses connecting a temperature dependent balancing resistor into one corner of the measuring bridge for compensating the temperature response characteristic of the null signal and for adjusting manufacturing tolerances. The temperature responsive balancing resistor is placed in an intimate heat transfer contact with the transducer body. However, the above mentioned problems have not been avoided because the balancing resistor is enclosed in an embedding member so that a correction after the embedding is no longer possible.

OBJECTS OF THE INVENTION

In view of the foregoing it is the aim of the invention to achieve the following objects singly or in combination:

to substantially reduce the spread of the temperature response characteristic of the null signal of strain gage transducers of the type described above so that the number of rejects during production is also substantially reduced;

to provide a possibility that even after the manufacturing steps of the strain gage transducer have been completed, an adjustment of the temperature response characteristic of the null signal is still possible; and to provide adjustment resistors outside the embedding member for adjustment after completion of the embedding of the main balancing resistor.

SUMMARY OF THE INVENTION

According to the invention the balancing or matching resistor means are embedded in an insulating embedding member, whereby the ends of the resistors which are connected into a corner of the bridge circuit are also connected to first conductor strips forming part of a connector cable. Further connector strips are connected to the other bridge corners and the connecting points are all located inside the embedding member. The connector cable is a flat flexible cable having conductor strips made of a conductor material having a very small temperature coefficient of its electrical resistance. The first conductor strips which are connected to the balancing resistor are provided with electrical adjustment resistors which also have a very small temperature coefficient of their electrical resistance. Both, the conductor strips and the adjustment resistors are made of the same conductor material and they are preferably produced in the same photoetching step. The adjustment resistors are initially short-circuited by conductor strip sections which remain outside the embedding member for a fine adjustment subsequent to the embedding by interrupting the required number of short-circuiting sections. The output ends of the first conductor strips connected to the balancing resistor are electrically interconnected at the output end of the connector cable, more specifically, they are short-circuited.

In the present transducers the temperature response characteristic of the null signal is initially adjusted in a conventional manner prior to the embedding by connecting the balancing resistor into a bridge corner. Additionally, if the final testing of the transducer shows that the response characteristics of the null signal is not within the required tolerance range, it is now possible, according to the invention, to make a further adjustment even after the embedding by means of the adjustment resistors forming part of the first conductor strips of the flat connector cable leading to the embedded balancing resistor. For this purpose, the respective first conductor strips are electrically interconnected or short-circuited at the output end of the cable and then the required short-circuiting sections are interrupted for distributing the effect of the balancing resistor proportionally onto the two half bridges of the strain gage measuring bridge. In an extreme situation, one or the other of the first conductor strips of the cable may be entirely interrupted so that the entire effect of the balancing resistor is applied only to one half bridge. This interruption of one or the other of said first conductor strips corresponds to the inclusion in the circuit of an infinitely large resistor.

In order to bring all transducers of a particular production run into the required narrow tolerance range of the temperature response characteristic of the null signal, it is thus necessary to select the balancing resistor or resistors in such a way that its effect corresponds to one half of the occurring temperature responsive null signal spread because the average or mean value of the temperature spread of the null signal will normally be about zero. On the other hand, the balancing can be performed only in steps. Therefore, it is necessary to select the number of adjustment resistors that can be placed in circuit with the balancing resistor by interrupting the respective short-circuit section, in such a way that this number will enable an adjustment bringing the particular transducer into the required narrow tolerance range. In this connection it is preferable to provide resistor steps in a binary fashion. This feature makes it possible to achieve the finest bridge balancing with the least number of adjustment resistors.

By selecting a material having a very small temperature coefficient for making the conductor strips and the adjustment resistors, the resistance of the conductor strips and the adjustment resistors are practically insensitive to temperature changes. As a result, a stable null signal is assured and falsifications of the measured signal are avoided. These advantages are assured because differing temperatures, or rather, temperature variations over time to which the transducer body or carrier spring, the cable, and the adjustment resistors in the cable may be exposed, cannot have an adverse influence which they otherwise would have due to the widely differing heat capacities and heat conductivities of the cable and transducer body.

Where a very fine balancing is needed, the balancing resistor may be divided into a plurality of individual balancing resistors connected to additional conductor strips of the connector cable. In this manner it is possible to connect the required resistors by a suitable selection into the respective bridge branch.

The invention substantially reduces the number of rejects in the production of such strain gage transducers. A further advantage is seen in the fact that the ever more stringent tolerance requirements can now be met by transducers according to the invention. It is also no longer necessary to sort a production run into different classes of accuracy. This advantage entails the further advantage that the number of transducers to be kept in stock has been reduced and that shipping procedures can accordingly be simplified.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
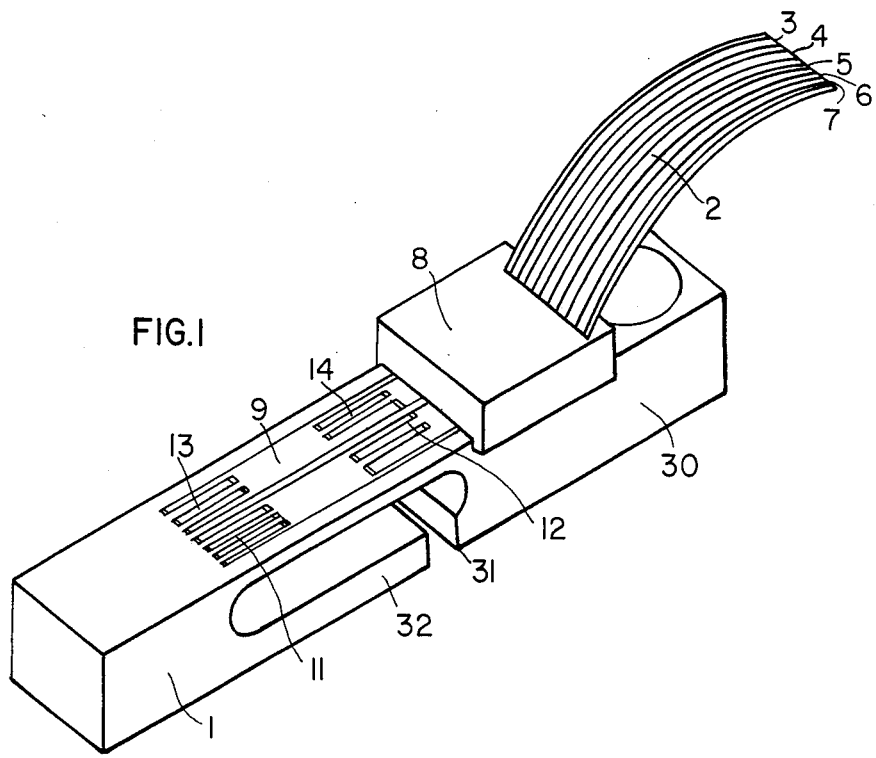
FIG. 1 is a perspective view of a strain gage transducer with its connector cable according to the invention.

The strain gage transducer of FIG. 1 is an example embodiment that is primarily used for weighing purposes. Therefore, the transducer is referred to as a weighing cell. Such cell comprises a spring carrier body 1 having a mounting end 30, a spring center portion 31, and a cantilever arm 32 for applying a force or load to the cell. A strain gage bridge circuit 9 comprising four individual strain gages 11, 12, 13, and 14 is applied to the spring center portion 31, for example, by an adhesive. The conductors leading to the bridge circuit on the one hand pass through an insulating embedding member 8 secured to the carrier body 1 and embedding the conductors, at least one balancing resistor 15, shown in FIG. 2, and the lead-in end of a flat, flexible cable 2 comprising two first conductor strips 4 and 5 and further conductor strips 3, 6, and 7.

Figure 2:
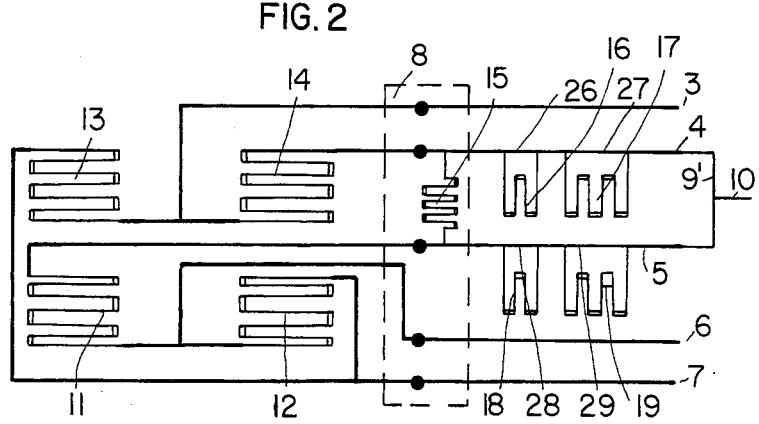
FIG. 2 is a circuit diagram of the strain gage transducer of FIG. 1.

The circuit diagram of FIG. 2 shows the balancing resistor 15 embedded in the embedding member 8 only shown by dashed lines in FIG. 2. A fine correction or tuning of the temperature response characteristic of the null signal of the transducer is performed by connecting the temperature responsive balancing resistor 15 initially into one corner of the full bridge circuit formed by the strain gages 11, 12, 13, and 14 before forming the embedding member 8. While the strain gages each have a resistance of about 1000Ω, the balancing resistor 15 is relatively small, for example, in the range of 0.05 to 0.15Ω. The temperature responsive balancing resistor 15 may be made, for example, of nickel and has a temperature coefficient of about 5900 ppm/°C. so that its resistance is temperature dependent. The ends of the temperature responsive balancing resistor 15 which are connected into the corner between the strain gage elements 11 and 14 are also connected to the first strip conductors 4 and 5 forming part of the flexible flat cable 2 which has further conductors 3, 6, and 7 leading to other respective corners of the bridge circuit through the embedding member 8. Incidentally, the embedding member 8 could be made of an epoxy resin, such as Araldit, (Registered Trademark).

The cable 2 is a flexible printed circuit type cable having a flat plate or substrate on which the conductor strips 3, 4, 5, 6, and 7 are produced from a metal foil adhesively bonded to the substrate and then etched in a photoetching procedure. The metal foil has a very small temperature response coefficient of its electrical resistance, for example, smaller than about 100 ppm/°C. Adjustment resistors 16, 17, 18, and 19 are formed simultaneously and in the same photoetching process as the conductor strips 3, 4, 5, 6, and 7. These adjustment resistors 16, 17, 18, and 19 are connected in series with the respective conductor strips 4 and 5. However, initially, these adjustment resistors are short-circuited by low resistance sections 26, 27, 28, and 29 forming part of the conductor strips 4 and 5. These adjustment resistors and their short-circuiting sections are outside of the embedding member 8 and are thus accessible for a fine adjustment after the embedding. The fine adjustment is performed by electrically interconnecting the output ends of the conductor strips 4 and 5 by a short-circuit conductor 9' also providing an output terminal 10, whereby it is possible to selectively include any or all of the adjustment resistors 16, 17, 18, 19 into the bridge circuit branches to thereby apply a proportional effect of the balancing resistor 15 to one or the other half bridge of the strain gage bridge circuit. In this way, a fine adjustment of the temperature response characteristic of the null signal of the transducer can be made even after the transducer as such has been completed.

Figure 4:
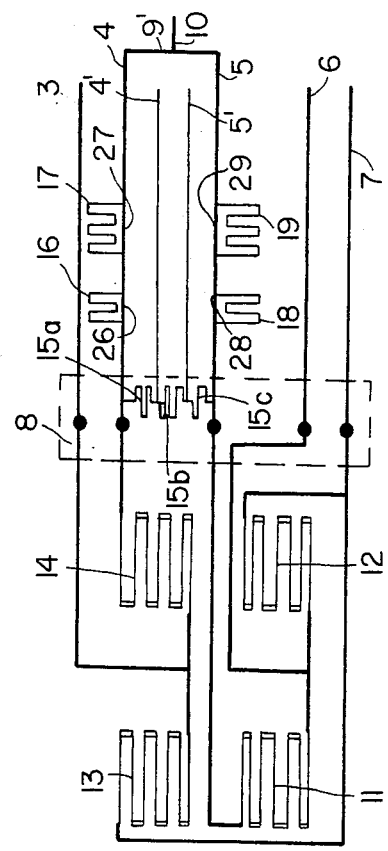
FIG. 4 is a view similar to that of FIG. 2, but showing a plurality of partial balancing resistors with respective connector cable conductor strips.

Even if the temperature responsive balancing resistors 15 is divided into a plurality of balancing resistor elements 15a, 15b, 15c as shown in FIG. 4, all of these elements would be embedded in the member 8 and additional strip conductors 4′, 5′ lead to these balancing resistor elements.

Figure 3:
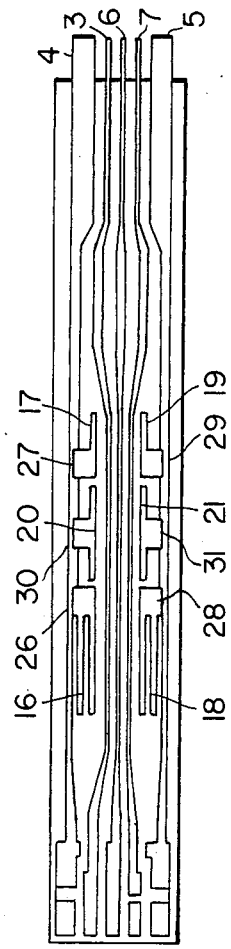
FIG. 3 illustrates an embodiment of a connector cable according to the invention, wherein the conductor strips leading to the balancing resistor are each provided with three adjustment resistors still shown in their short-circuited stage.

FIG. 3 shows a practical embodiment of such a flexible connector cable in which the adjustment resistances 16, 20, and 17 in the conductor strip 4 and the adjustment resistors 18, 21, and 19 are illustrated on an enlarged scale. The conductor strip 4 comprises, in addition to the above mentioned adjustment resistors 16 and 17, an adjustment resistor 20 with its own short-circuiting section 30. Similarly, the conductor strip 5 includes in addition to the adjustment resistors 18 and 19, an adjustment resistor 21 with its own short-circuit section 31′. Preferably, these resistors 16, 20, and 17, as well as 18, 21, and 19 are sized so that they satisfy binary steps.

In one example embodiment the resistors 17 and 19 had a resistance of 0.3Ω; the resistors 20 and 21 were 0.7Ω, and the resistors 16 and 18 were 2Ω.

Although the invention has been described with reference to specific example embodiments, it will be appreciated, that it is intended to cover all modifications and equivalents within the scope of the appended claims.

What I claim is:

1. A strain gage transducer, comprising a carrier spring, four strain gages secured to said carrier spring and electrically interconnected to form a measuring bridge circuit, temperature responsive balancing resistor means (15) electrically connected in a first bridge corner and mounted in a intimate heat transfer contact on said carrier spring, a flat, flexible connector cable (2) having first conductor strips (4,5) connected to ends of said temperature responsive balancing resistor means (15) and further conductor strips (3, 6, 7) connected to further bridge corners, an insulating member (8) secured to said carrier spring and embedding said temperature responsive balancing resistor means and portions of said first and further conductor strips passing through said insulating embedding member, adjustment resistors (16, 17, 18, 19) connected to said first conductor strips (4, 5) outside of said insulating embedding member (8) for adjusting a bridge balance, short-circuit sections (26, 27, 28, 29) in said first conductor strips (4, 5) initially short-circuiting said adjustment resistors outside said insulating embedding member (8) for connecting one or more respective adjustment resistors in series with said temperature responsive balancing resistor means (15) by interrupting the corresponding short-circuit section, said conductor strips (3, 4, 5, 6, 7) and said adjustment resistors (16, 17, 18, 19) being made of the same material having an electrical resistance with a very small temperature coefficient, and means electrically interconnecting said first conductor strips (4, 5) at an output end of said flat, flexible connector cable.

2. The strain gage transducer of claim 1, wherein all of said conductor strips (3, 4, 5, 6, 7), said adjustment resistors (16, 17, 18, 19), and said short-circuit sections (26, 27, 28, 29) have been produced together by a single photoetching process.

3. The strain gage transducer of claim 1, wherein said temperature responsive balancing resistor means (15) has a resistance value having an effect corresponding to one half of a temperature responsive null signal spread into which a substantial group of such strain gage transducers falls during production, and wherein said adjustment resistors (16, 17, 18, 19) have such a number and resistance steps, that almost all strain gage transducers of said substantial group can be adjusted to fall into a narrow temperature responsive null signal tolerance range by interrupting the required short-circuit section or sections.

4. The strain gage transducer of claim 3, wherein said resistance of said temperature responsive balancing resistor means (15) is within the range of 0.05Ω to 0.15Ω, wherein said temperature responsive null signal spread is within −0.2 and +0.2 μv.°C., wherein each of said first conductor strips comprise at least two of said adjustment resistors having said resistance steps within the range of about 0.3Ω to about 2Ω, and wherein said narrow temperature responsive null signal tolerance range runs from −0.02 to +0.02 μV/V.°C.

5. The strain gage transducer of claim 3, wherein resistance steps of said adjustment resistors (16, 17, 18, 19) are binary spaced resistance steps.

6. The strain gage transducer of claim 1, wherein said temperature responsive balancing resistor means (15) comprise a plurality of partial balancing resistors, and wherein said connector cable comprises additional conductor strips for said partial balancing resistors.

* * * * *

UNITED STATES PATENT AND TRADEMARK OFFICE
CERTIFICATE OF CORRECTION

PATENT NO. : 4,748,858

DATED : June 7, 1988

INVENTOR(S) : Werner Ort

It is certified that error appears in the above-identified patent and that said Letters Patent is hereby corrected as shown below:

Claim 1, (Column 5, line 41) replace "a" by --an--.

Claim 4, (Column 6, line 37) replace "-0.2 and + 0.2 $\mu v.°C.$," by: -- —0.2 and +0.2 $\mu V/V·°C.$,--.

Signed and Sealed this

Eleventh Day of October, 1988

*Attest:*

DONALD J. QUIGG

*Attesting Officer*  *Commissioner of Patents and Trademarks*